(12) United States Patent
Kamiya et al.

(10) Patent No.: US 8,189,953 B2
(45) Date of Patent: May 29, 2012

(54) IMAGE PROCESSING APPARATUS AND IMAGE PROCESSING METHOD

(75) Inventors: Ryo Kamiya, Kanagawa (JP); Masayuki Ito, Nagano (JP)

(73) Assignees: Sony Corporation, Tokyo (JP); OPT Corporation, Nagano (JP)

( * ) Notice: Subject to any disclaimer, the term of this patent is extended or adjusted under 35 U.S.C. 154(b) by 1006 days.

(21) Appl. No.: 11/942,450

(22) Filed: Nov. 19, 2007

(65) Prior Publication Data

US 2008/0118180 A1    May 22, 2008

(30) Foreign Application Priority Data

Nov. 22, 2006   (JP) .................................. 2006-315164

(51) Int. Cl.
*G06K 9/40* (2006.01)
*G06K 9/32* (2006.01)

(52) U.S. Cl. ......... 382/275; 382/255; 382/298; 382/299

(58) Field of Classification Search .................. 382/255, 382/275, 298, 299; 345/660–671, 698–699
See application file for complete search history.

(56) References Cited

U.S. PATENT DOCUMENTS

| | | | | |
|---|---|---|---|---|
| 5,986,699 | A * | 11/1999 | Nishihara | 348/222.1 |
| 6,710,801 | B1 * | 3/2004 | Kubo | 348/222.1 |
| 6,891,569 | B1 * | 5/2005 | Matsuoka et al. | 348/302 |
| 7,202,888 | B2 * | 4/2007 | Tecu et al. | 348/208.11 |
| 7,570,280 | B2 * | 8/2009 | Ozaki | 348/36 |
| 7,714,936 | B1 * | 5/2010 | Martin et al. | 348/576 |
| 7,813,585 | B2 * | 10/2010 | Higurashi et al. | 382/275 |
| 7,848,575 | B2 * | 12/2010 | Watanabe et al. | 382/192 |
| 2001/0030707 | A1 * | 10/2001 | Fujii | 348/335 |
| 2002/0064341 | A1 * | 5/2002 | Fauver et al. | 385/25 |
| 2004/0027346 | A1 * | 2/2004 | Naske | 345/419 |
| 2004/0091083 | A1 * | 5/2004 | Jurgen | 378/205 |
| 2005/0058360 | A1 * | 3/2005 | Berkey et al. | 382/254 |
| 2005/0174590 | A1 * | 8/2005 | Kubo | 358/1.9 |
| 2006/0109343 | A1 * | 5/2006 | Watanabe et al. | 348/79 |
| 2006/0187305 | A1 * | 8/2006 | Trivedi et al. | 348/169 |
| 2006/0239534 | A1 * | 10/2006 | Sumida et al. | 382/133 |
| 2006/0268129 | A1 * | 11/2006 | Deng | 348/239 |
| 2006/0268300 | A1 * | 11/2006 | Suzuki | 358/1.9 |
| 2007/0047805 | A1 * | 3/2007 | Ohtsu | 382/164 |

FOREIGN PATENT DOCUMENTS

| | | |
|---|---|---|
| JP | 2000-324386 | 11/2000 |
| JP | 2002-354299 | 12/2002 |
| JP | 2002-358537 | 12/2002 |
| JP | 2005-286954 | 10/2005 |
| JP | 2006216871 A * | 8/2006 |
| JP | 2006-287597 | 10/2006 |

* cited by examiner

Primary Examiner — Michelle Entezari

(74) Attorney, Agent, or Firm — SNR Denton US LLP

(57) ABSTRACT

An image processing apparatus is disclosed. The image processing apparatus includes a thinning-out section generating thinned-out line data of thinned-out data constituted by a plurality of the thinned-out line data, the thinned-out data being obtained by thinning out wide-field image data with distortion captured using a wide-angle lens, and sequentially outputting the thinned-out line data at every predetermined timing, a switching section performing switching from an output of the wide-field image data to an output of the thinned-out line data in response to the predetermined timing, and a buffer temporarily storing the wide-field image data and the thinned-out data constituted by the plurality of thinned-out data outputted after the switching.

6 Claims, 19 Drawing Sheets

Y0 Y1 Y2 Y3 Y4 Y5 Y6 Y7

Cb0　Cb2　Cb4　Cb6

\+

Ys0　　Ys8

Cbs0　Cbs8

\+ ...

$Ys0 = Y0+Y1+Y2+Y3+Y4+Y5+Y6+Y7$ $Cbs0 = Cb0 + Cb2 + Cb4 + Cb6$

FIG.20

IMAGE PROCESSING APPARATUS AND IMAGE PROCESSING METHOD

CROSS REFERENCES TO RELATED APPLICATIONS

The present invention contains subject matter related to Japanese Patent Application JP 2006-315164 filed in the Japanese Patent Office on Nov. 22, 2006, the entire contents of which being incorporated herein by reference.

BACKGROUND OF THE INVENTION

1. Field of the Invention

The present invention relates to an image processing apparatus and an image processing method for processing an image captured using a wide-angle lens.

2. Description of the Related Art

In the past, there has been proposed a technique in which a necessary area in an image captured, for example, using a fisheye lens is designated by a user, distortion aberration of fisheye image data of the designated area is corrected, and the corrected image is displayed on a monitor. The captured image is not only a still image but also a moving image (for example, see Patent Document 1).

In this Patent Document 1, fisheye image data (24) is displayed on part of a monitor (28), and a display area (25) is designated by designating part of the displayed data with a control stick (27). A plane reproduced image (29) obtained by correcting distortion aberration of the designated fisheye image data (24) is displayed on the monitor (28). When the fisheye image data (24) is tried to be added to part of the plane reproduced image (29) as just described, it is necessary to read pixel data of the plane reproduced image (29) and reconstruct the image.

Patent Document 1: Japanese Patent Application Laid-Open No. 2000-324386 (paragraph [0010], FIG. 1, FIG. 2)

SUMMARY OF THE INVENTION

When a high-pixel sensor is used as an image-capturing sensor when data such as fisheye image data is added to part of an entire screen as described above, it takes time to read the above pixel data.

In view of the above circumstances, it is desirable to provide a technique capable of efficiently performing processing when a wide-field image captured using a wide-angle lens is added to part of an entire screen.

According to an embodiment of the present invention, there is provided an image processing apparatus. The image processing apparatus includes a thinning-out section generating thinned-out line data of thinned-out data constituted by a plurality of the thinned-out line data, the thinned-out data being obtained by thinning out wide-field image data with distortion captured using a wide-angle lens, and sequentially outputting the thinned-out line data at every predetermined timing, a switching section performing switching from an output of the wide-field image data to an output of the thinned-out line data in response to the predetermined timing, and a buffer temporarily storing the wide-field image data and the thinned-out data constituted by the plurality of thinned-out line data outputted after the switching.

In the embodiment of the present invention, the thinned-out line data generated by the thinning-out section is outputted to the buffer after the switching from the wide-field image data to the thinned-out lined data. Thus, the thinned-out data corresponding to the wide-field image data is efficiently generated.

According to the embodiment of the present invention, the thinning-out section includes a first addition section adding pixel data of respective pixels constituting the wide-field image data in units of a predetermined number of pixels in a line direction and outputting added pixel data obtained by the addition, and a second addition section adding line data constituted by a predetermined number of the added pixel data sequentially outputted in units of a predetermined number of lines in a column direction and outputting the thinned-out line data obtained by the addition. In the embodiment of the present invention, the separation between the line direction and the column direction enables efficient thinning-out processing.

According to the embodiment of the present invention, the image processing apparatus further includes a conversion section converting RGB data of the wide-field image into luminance/color difference data containing luminance data and color difference data, and the thinning-out section generates the thinned-out line data of the luminance/color difference data obtained by the conversion by the conversion section. In the embodiment of the present invention, after the conversion into the luminance/color difference data having a smaller data amount than the RGB data, the thinned-out data is generated, which makes it possible to reduce the calculation amount and realize efficient processing.

According to the embodiment of the present invention, the thinning-out section generates the thinned-out line data in the same format as that of the luminance/color difference data obtained by the conversion by the conversion section. Consequently, the luminance/color difference data subjected to the thinning-out processing can be faithfully reproduced in the thinned-out line data.

According to the embodiment of the present invention, the image processing apparatus further includes a correction section correcting the distortion of an image of a selected area selected out of the wide-field image, and a synthesis section synthesizing a distortion-corrected image obtained by the correction section and the thinned-out data including a highlighted area obtained by highlighting the selected area as image data of one screen. In the embodiment of the present invention, the highlighted area is included in the thinned-out data, so that a user can recognize which portion of a wide-field entire image (image of thinned-out data) is highlighted. Additionally, the image obtained by correcting distortion of the selected area image and the thinned-out image are synthesized, so that the user can see the distortion-corrected image while seeing the thinned-out image.

An image processing method according to an embodiment of the present invention includes generating thinned-out line data of thinned-out data constituted by a plurality of the thinned-out line data, the thinned-out data being obtained by thinning out wide-field image data with distortion captured using a wide-angle lens, sequentially outputting the thinned-out line data at every predetermined timing, performing switching from an output of the wide-field image data to an output of the thinned-out line data in response to the predetermined timing, and temporarily storing the wide-field image data and the thinned-out data constituted by the plurality of thinned-out line data outputted after the switching.

As described above, according to the embodiment of the present invention, in the processing in which the thinned-out data is added to part of the wide-field image, efficient processing can be performed.

BRIEF DESCRIPTION OF DRAWINGS

FIG. 20 is a diagram showing a manner in which pixel data of YCrCb are added;

DESCRIPTION OF PREFERRED EMBODIMENTS

An embodiment of the present invention will be described below with referenced to the drawings.

Figure 1:
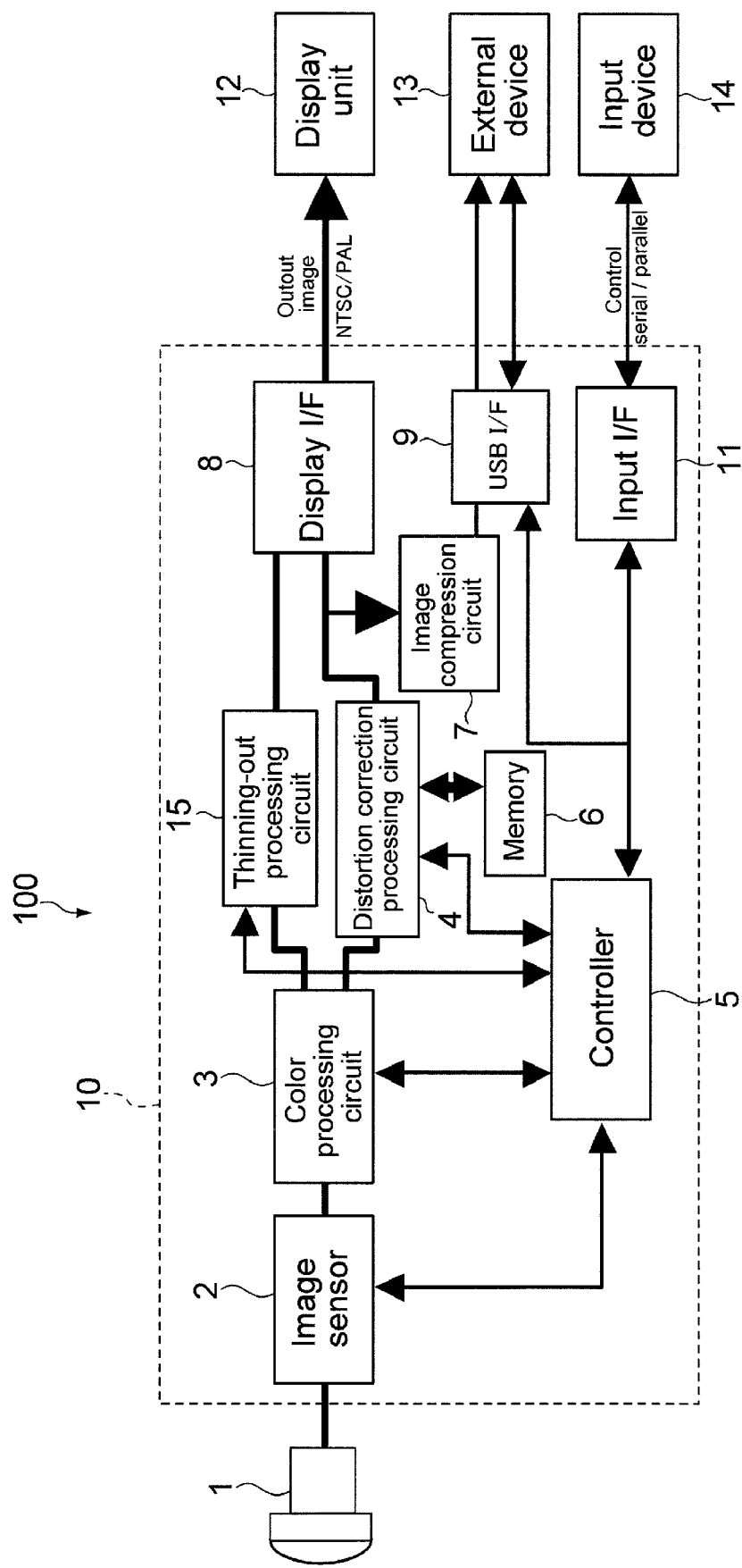
FIG. 1 is a block diagram showing the configuration of an image processing system according to an embodiment of the present invention.

FIG. 1 is a block diagram showing the configuration of an image processing system according to an embodiment of the present invention. An image processing system includes a wide-angle lens 1, an image processing apparatus 10, and a display unit 12 and in addition, includes an external device 13, an input device 14, and so on. The image processing apparatus 10 includes an image sensor 2, a color processing circuit 3, a distortion correction processing circuit 4, a thinning-out processing circuit 15, a controller 5, a memory 6, an image compression circuit 7, a display interface 8, a USB (Universal Serial Bus) interface 9, and an input device interface 11.

The image sensor 2 is a sensor which converts light taken in through the wide-angle lens 1 into an electrical signal. For example, a CMOS (Complementary Metal-Oxide Semiconductor) sensor, a CCD (Charge Coupled Device), or the like is used. As the wide-angle lens 1, a lens having a wide viewing angle or a wide field angle is used, and, for example, a lens having a field angle of 45 degrees or more is used, but the wide-angle lens 1 is not limited to this. As an example of the wide-angle lens 1, a fisheye lens, a PAL (Panoramic Annular Lens) (annular lens) which can obtain an annular image, or the like is cited. Alternatively, by using two fisheye lenses having a field angle of about 180°, an image can be captured with an all-round (spherical space (360°)) field of view.

The color processing circuit 3 includes a YCrCb conversion circuit (not shown) which coverts RGB data outputted from the image sensor 2 into YCrCb data (YUV data) containing luminance data and color difference data. The color processing circuit 3 additionally includes, although not shown, an AE (Automatic Exposure) operation circuit which controls light intensity, an AWB (Automatic White Balance) operation circuit which controls white balance, and a gain adjustment circuit which performs gain adjustment on each RGrGbB pixel filter by a nonlinear table.

As described in FIG. 2C, the thinning-out processing circuit 15 is a circuit which generates a wide-field image (hereinafter called a thinned-out image) 45 obtained by thinning out a wide-field image 25.

The distortion correction processing circuit 4 mainly performs distortion correction processing on an image with distortion processed by the color processing circuit 3. Further, the distortion correction processing circuit 4 performs coordinate interpolation processing of the pixel data (above YCrCb data) containing the luminance data and the color difference data in the distortion correction processing as will be described later. The memory 6 functions as a buffer in the processing of the distortion correction processing circuit 4. In particular, the memory 6 has a function of storing pixel data (RGB data or YCrCb data) of a selected area image described later. A DMA (Direct Memory Access) circuit not shown may be connected to the memory 6. In this case, data is inputted to and outputted from the memory 6 independently of the control of the controller 5.

The controller 5 performs overall control on the entire image processing apparatus 10 and is constituted, for example, by a CPU (Central Processing Unit).

The image compression circuit 7 compresses the image processed by the distortion correction processing circuit 4 in a predetermined format. As the compression format, for example, JPEG (Joint Photographic Expert Group) is used. However, any other publicly known format may be used appropriately.

The display interface 8 is an interface which outputs the image processed by the distortion correction processing circuit 4 to the display unit 12. The display interface 8 generates output data, for example, in an NTSC (National Television System Committee) format, a PAL (Phase Alternating Line) format, or the like.

The USB interface 9 controls an output of the image processed by the image compression circuit 7 to the external device 13 such as an external computer. Incidentally, the above display interface 8 also may output the image compressed by the image compression circuit 7.

The input device interface 11, for example, receives a signal of an operation input by a user. As the input device 14, for example, a mouse, a keyboard, a switch device, a touch sensor, a controller of a game device, a stick-shaped operation device graspable by the user, or some other device is cited.

Incidentally, the "image" in this embodiment includes a still image, but in actuality, it is processed as a moving image in many cases.

The color processing circuit 3, the distortion correction processing circuit 4, the thinning-out processing circuit 15, the controller 5, and so on can each realize processing, for example, by at least either of an FPGA (Field Programmable Gate Array) or a DSP (Digital Signal Processor).

Figure 2A:
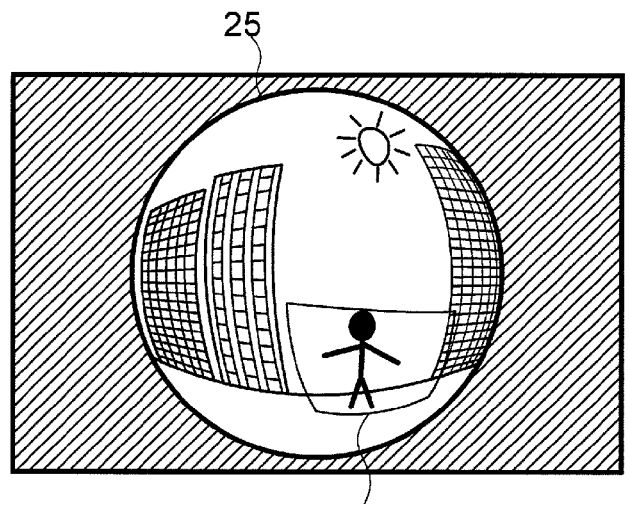
FIGS. 2A to 2C are diagrams showing examples of various images which are image-processed by an image processing apparatus and displayed in a display unit.
Figure 2B:
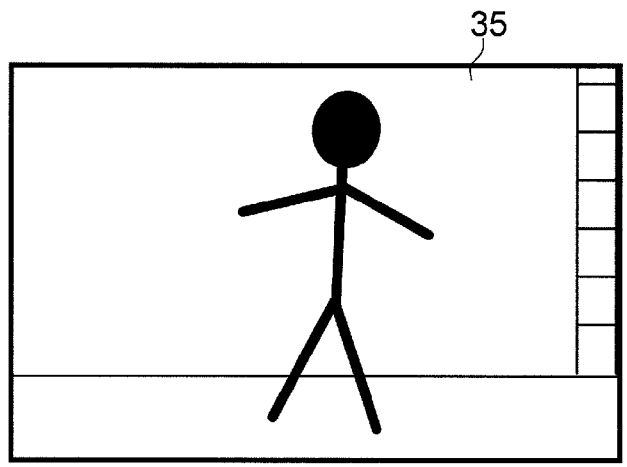
Figure 2C:
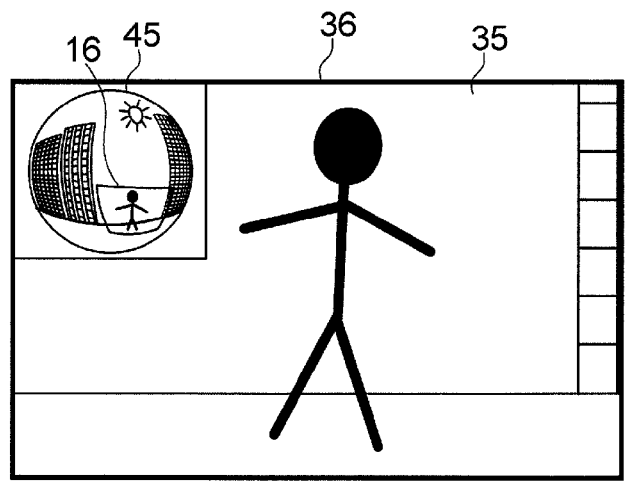

FIGS. 2A to 2C show examples of various images which are image-processed by this image processing apparatus 10 and displayed in the display unit 12. FIG. 2A shows an entire image including a highlighted area 16 obtained by highlighting a selected area in the wide-field image 25 obtained by the wide-angle lens 1. The highlighted area 16 is, for example, a frame-shaped cursor. However, the highlighted area 16 is not limited to such a cursor and may take such a form as to be displayed in a different color from that of portions other than the highlighted area 16 in the entire image 25. Namely, the highlighted area 16 has only to take such a form that when seeing the wide-field image 25, the user can distinguish this highlighted area from the other areas. Using the input device 14, the user selects a desired area (range surrounded by the highlighted area 16) in the entire image 25 by the highlighted area 16, and the controller 5 performs a variety of processing with this range as the selected area.

Hereinafter, the image in FIG. 2A which does not include the highlighted area 16 is called the "wide-field image". Further, as shown in FIG. 2A, the image including the highlighted area 16 in the wide-field image is called the "entire image 25", and thus the distinction between the "wide-field image 25" and the "entire image 25" is made. Furthermore, an image of the range surrounded by the highlighted area 16 is called a "selected area image".

The selected area in the entire image 25 is not limited to taking the form of being selected by the user. For example, a form in which a preset area in the entire image 25 is selected is conceivable. Information indicating this area (positional information, etc.) in this case is only necessary to be previously stored in a ROM, an external storage, or the like not shown. A form in which in a case where some specific area in the entire image 25 is automatically recognized in addition to the above case where the selected area is preset, the automatically recognized "specific area" is processed as the "selected area" is also conceivable. Alternatively, a form in which an image area of a portion detected in the entire image 25 by each of various sensors not shown is processed as the "selected area" is also conceivable. In this case, examples of the sensors include a light sensor, a temperature sensor, a pressure sensor, a sound sensor, a humidity sensor, a vibration sensor, a gas sensor, and other various sensors.

FIG. 2B is a diagram showing a distortion-corrected image obtained by correcting distortion of the selected area. FIG. 2C shows a synthetic image 36 obtained by synthesizing the thinned-out image 45 obtained by thinning out the above entire image 25 and a distortion-corrected image 35 obtained by correcting the distortion as image data of one screen. The distortion correction processing circuit 4 also generates such a synthetic image and outputs it to the display unit 12 or the like. The highlighted area 16 is synthesized and displayed also in the thinned-out image 45 shown in FIG. 2C, so that the user can recognize which portion of the wide-field thinned-out image 45 is highlighted. Additionally, the image obtained by correcting distortion of the selected area image and the thinned-out image 45 are synthesized, so that the user can see the distortion-corrected image 35 while seeing the thinned-out image 45. In the generation of the synthetic image 36, for example, an OSD (On Screen Display) technique or the like has only to be used.

The controller 5 can perform switching between outputs of the entire image 25, the distortion-corrected image 35, and the synthetic image 36 shown in FIGS. 2A, 2B, and 2C, for example, in response to input information from the input device interface 11. In other words, the controller 5 has mainly three display modes, and appropriately perform switching between these modes.

Incidentally, the mode in which the entire image 25 in FIG. 2A is displayed may be a mode in which the wide-field image 25, in which the highlighted area 16 is not displayed, is displayed. The display position of thinned-out data shown in FIG. 2C is at the upper left of the selected area image 35, but can be arbitrarily set.

Next, forms of the installation state of a camera equipped with the wide-angle lens 1 will be described.

Figure 3:
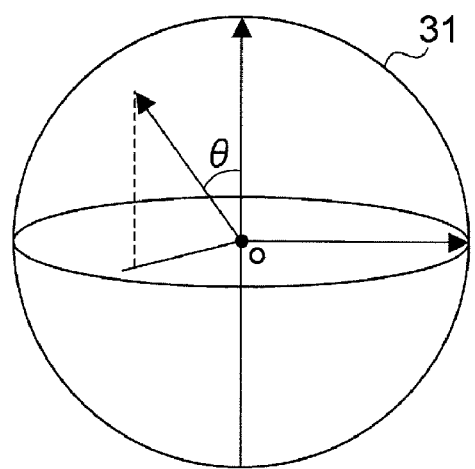
FIG. 3 is a diagram showing a field of view represented by a sphere.
Figure 4A:
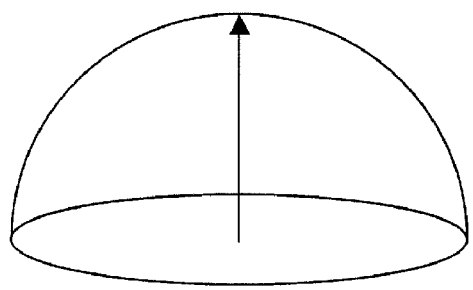
FIGS. 4A to 4C are diagrams each showing a field of view (captured range) when an image is captured by a camera using a wide-angle lens.
Figure 4B:
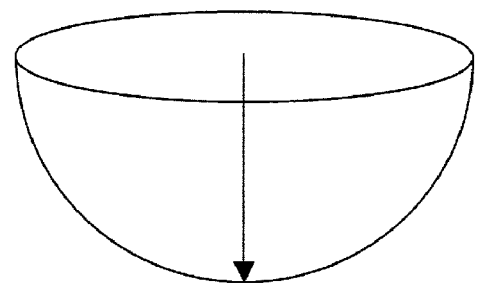
Figure 4C:
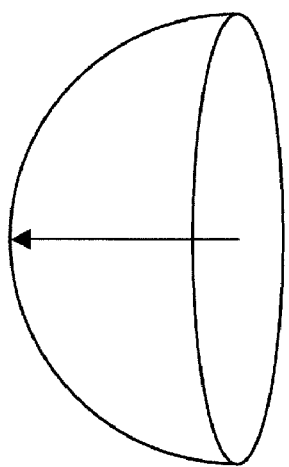

When the viewpoint is at a center O of a sphere 31 with reference to FIG. 3, the field of view which this viewpoint O can capture becomes a three-dimensional space represented by the sphere 31. When, for example, a fisheye lens with a field of view of about 180° is used as the wide-angle lens 1, the field of view captured by this fisheye lens is a hemispherical portion of the sphere 31. For example, FIG. 4A shows a field of view of an upper half of the sphere 31 (in an upward direction in the actual three-dimensional space) (hereinafter called an upper hemispherical field of view). FIG. 4B shows a field of view of a lower half of the sphere 31 (in a downward direction in the actual three-dimensional space) (hereinafter called a lower hemispherical field of view). FIG. 4C shows a field of view of a lateral half of the sphere 31 (hereinafter called a lateral hemispherical field of view). In particular, in the example of FIG. 4A, the case of viewing upward from the ground, the floor, and the desk is assumed. In the example of FIG. 4B, the case of viewing downward from the ceiling and from the above is assumed. In the example of FIG. 4C, the case of viewing horizontally or laterally from the wall or the like perpendicular to the ground is assumed.

In addition to these, obliquely upper half and obliquely lower half fields of view are also conceivable. As just described, various hemispherical fields of view can be obtained by variously setting the orientation or inclination of the fisheye lens when the fisheye lens is installed.

Incidentally, in FIGS. 4A to 4C, the case where the fisheye lens is used is described. In addition to this case, also when various kinds of wide-angle lenses 1 are used, the field of view, of course, changes according to the orientation or inclination of each of the lenses.

Figure 5:
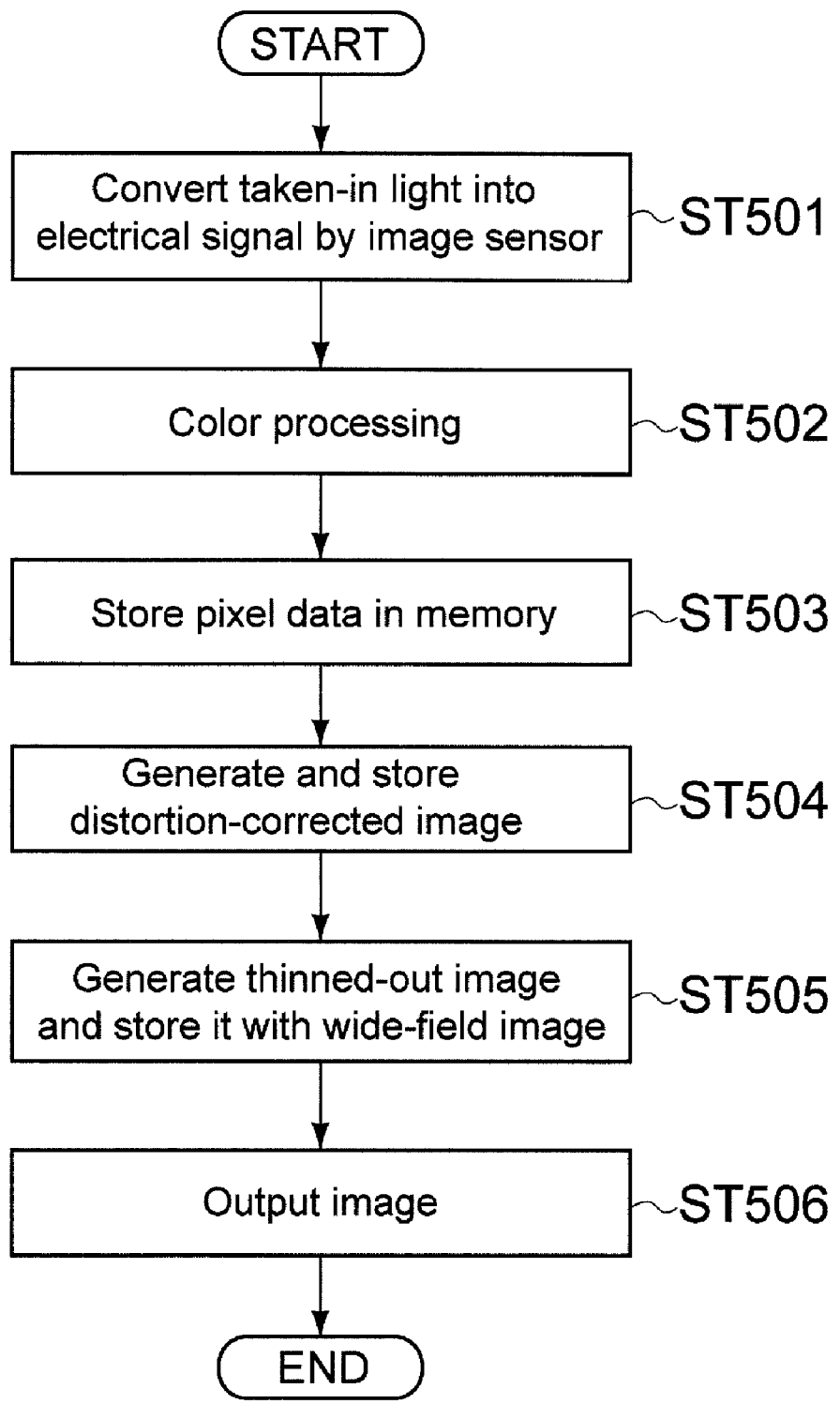
FIG. 5 is a flowchart showing the operation of the image processing apparatus.

Next, the operation of the image processing apparatus 10 thus constituted will be described. FIG. 5 is a flowchart showing this operation.

The controller 5 converts the light taken in through the fisheye lens 1 into the electrical signal by the image sensor 2 (step 501). The controller 5 performs the color processing by the color processing circuit 3 (step 502). In the color processing, particularly the RGB data is converted into the YCrCb data. In this conversion processing, a 4:4:4 format has only to be adopted. Alternatively, thinning-out in a 4:2:2 format, a 4:1:1 format, or a 4:2:0 format may also be performed. The YCrCb data is stored in the memory 6 (step 503).

Incidentally, conversion equations from RGB to YCrCb are expressed by the following equations (1) to (3). However, in these equations, numerical values of each term may slightly vary.

$$Y=0.299R+0.587G+0.114B \quad (1)$$

$$Cr=0.500R-0.419G-0.081B \quad (2)$$

$$Cb=-0.169R-0.331G+0.500B \quad (3)$$

The controller 5 performs the distortion correction processing on the selected area image in the entire image 25 in response to the input information from the input device interface 11 and generates the distortion-corrected image 35 by the distortion correction processing circuit 4 and stores it (step 504). Typically, the distortion correction processing circuit 4 finds an address of the memory 6 corresponding to coordinates of a pixel of a display plane displayed by the display unit 12 by coordinate calculation processing as will be described later. Namely, coordinate conversion processing is performed. The address of the memory 6 corresponds to correction coordinates of the selected area image. The correction coordinates, that is, memory address, found by the calculation includes a decimal point in many cases. Accordingly, the distortion correction processing circuit 4 generates the distortion-corrected image 35 by generating the pixel data by the coordinate interpolation processing.

Meanwhile, the thinning-out processing circuit 15 generates the thinned-out image 45 from the YCrCb data (data on the wide-field image 25) stored in the memory 6 in step 503 and stores this thinned-out image 45 with the wide-field image 25 in a frame buffer 27 (see FIG. 11) (step 505).

The controller 5 outputs the generated entire image 25 (distortion-corrected image 35, or synthetic image 36) shown in FIGS. 2A to 2C to the display unit 12 via various interfaces 8, 9, and 11 in response to an input signal from the input device 14 (step 506).

Incidentally, the order of step 504 and step 505 does not matter, or these steps may be performed simultaneously.

Next, the above step 504 will be described in detail. First, the distortion correction by the distortion correction processing circuit 4 will be described.

Figure 6A:
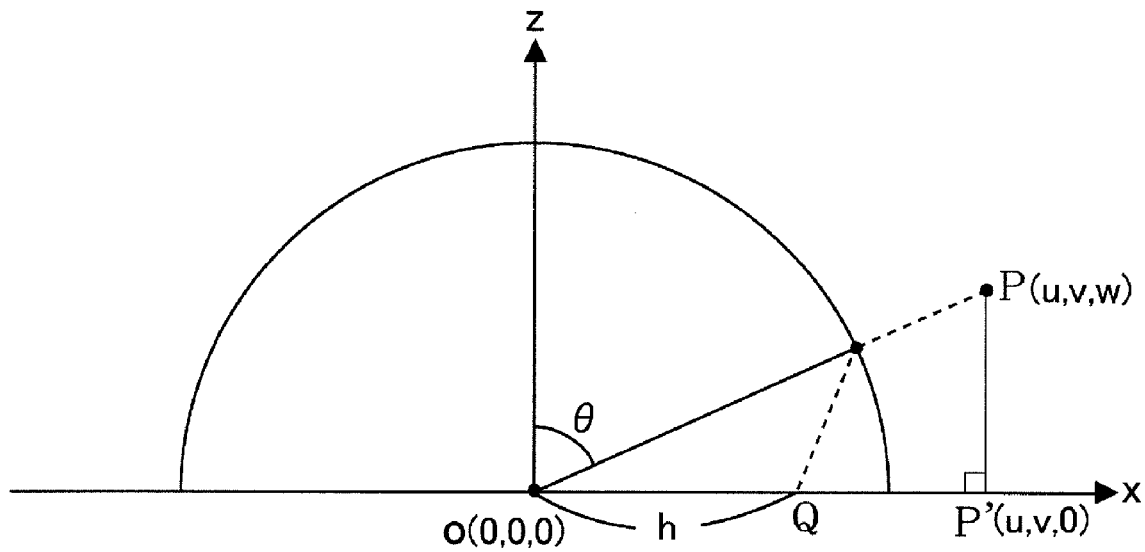
FIGS. 6A and 6B are diagrams to explain an example of the principle of a coordinate conversion.
Figure 6B:
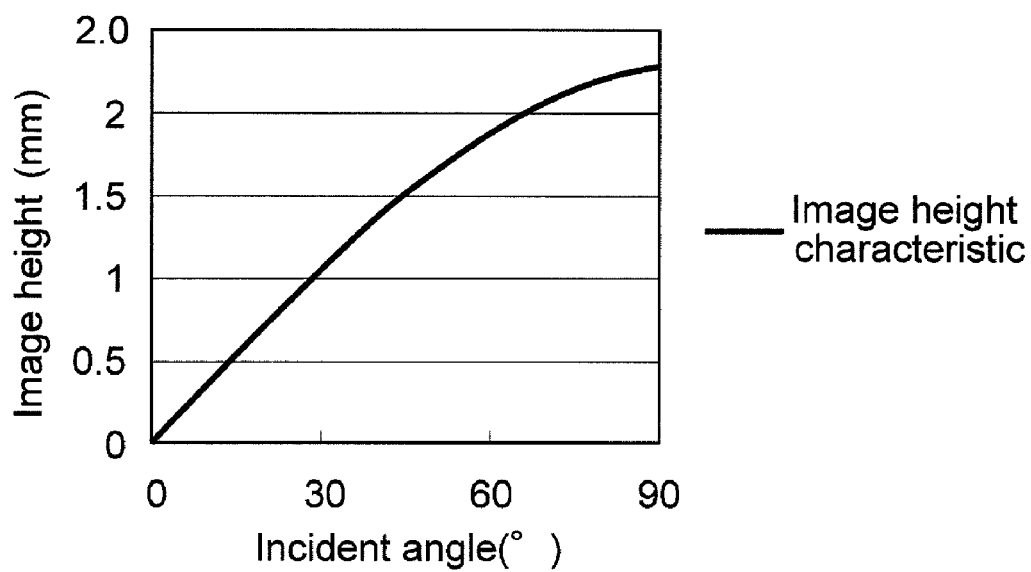

In FIG. 6A, the above upper hemisphere of the upper hemispherical field of view with a view point o (0, 0, 0) as the center is seen from the side. In the figure, a point P (u, v, w) represents a surrounding shot point, a point Q an imaging point of the entire image 25 as a fisheye image, an angle θ an incident angle from the point P to the viewpoint, and a distance h an image height. The point P and the point Q are associated with each other by an image height characteristic. FIG. 6B is a graph showing this image height characteristic. The horizontal axis represents the angle (incident angle) θ, and the vertical axis the height h. This data has only to be previously stored as a conversion table in the memory 6 or another memory not shown.

Figure 7A:
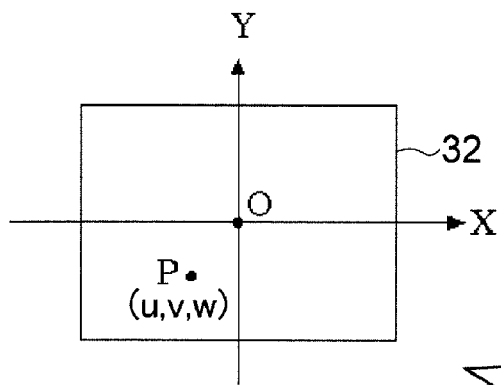
FIGS. 7A to 7D are diagrams to explain the example of the principle of the coordinate conversion.
Figure 7B:
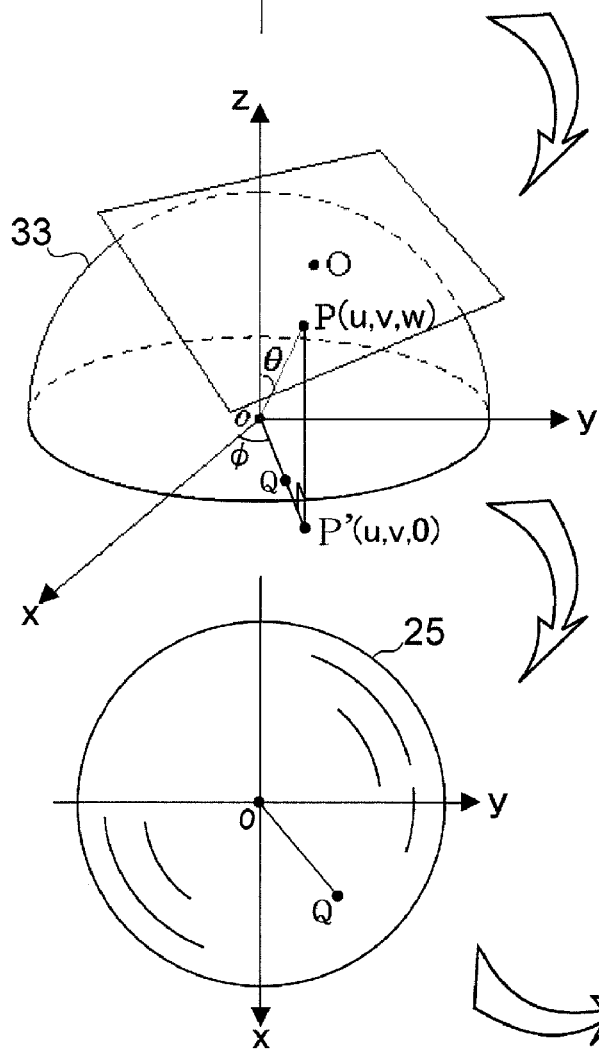
Figure 7C:
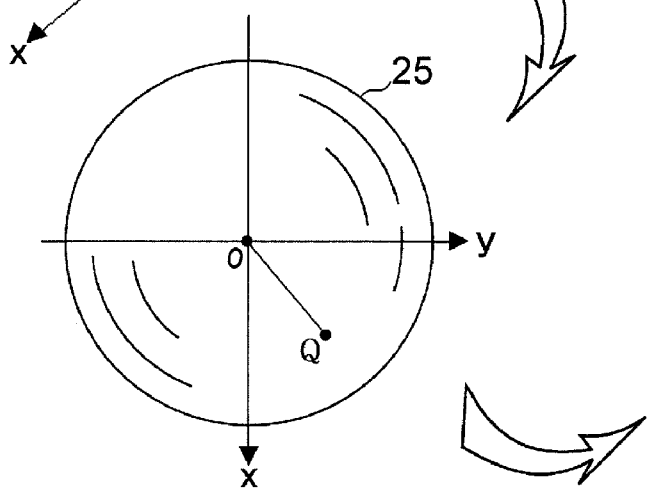

Here, FIG. 7A shows the display plane which is a plane in a range displayed in the display unit 12. FIG. 7B is a diagram three-dimensionally showing an upper sphere shown in FIG. 7A. An image obtained by projecting a spherical surface 33 shown in FIG. 7B onto an x-y plane becomes the wide-field image 25 shown in FIG. 7C. This wide-field image 25 is the image before the distortion correction obtained by the image sensor 2. A center O of the above display plane 32 touches the spherical surface 33 formed by the upper spherical field of view, and the display plane 32 becomes a screen on which the selected area in the above wide-field image 25 is displayed.

Next, the coordinate conversion processing for the distortion correction will be described.

Figure 8:
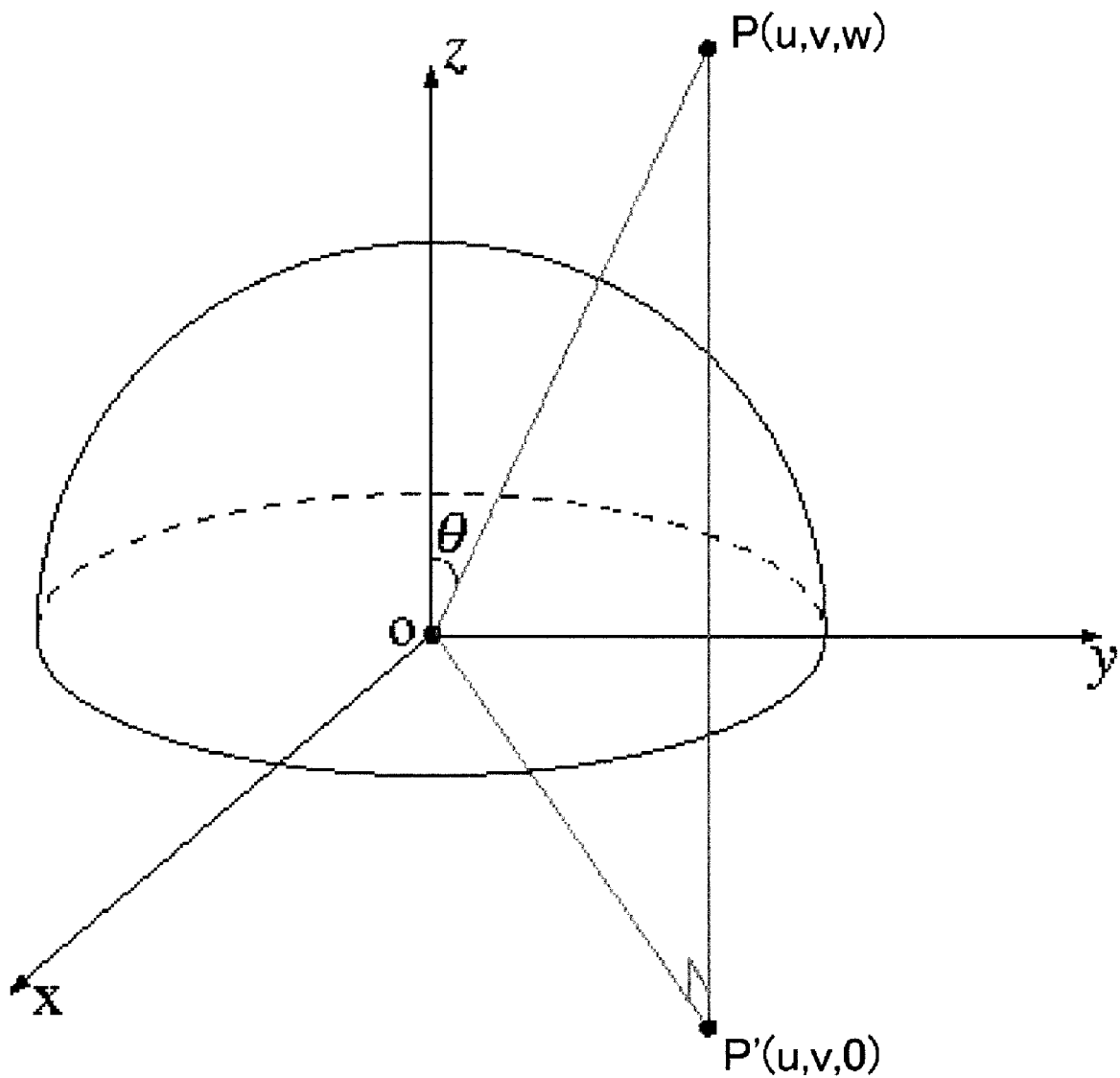
FIG. 8 is a diagram to explain the example of the principle of the coordinate conversion.

First, the incident angle (elevation angle) θ of P (u, v, w) is found with reference to FIG. 8. If the center of coordinates is o (0, 0, 0) in FIG. 8, the following equation is obtained.

$$OP=(u^2+v^2+w^2)^{1/2} \quad (4)$$

θ is expressed by the following equation.

$$\theta=\arccos(w/OP) \quad (5)$$

The image height h (see FIG. 6A) is found from θ found in the equation (5). As described above, the image height h is found from the image height characteristic in FIG. 6B.

When the image height h is found, a point P' (u, v, 0) which is vertically below the point P is scaled up or down to the point Q (x, y) (see FIG. 6A) as the position of the image height h. More specifically, coordinates of the point Q is found from the following equations.

$$OP'=OP\sin\theta \quad (6)$$

$$x=uh/OP' \quad (7)$$

$$y=vh/OP' \quad (8)$$

Figure 7D:
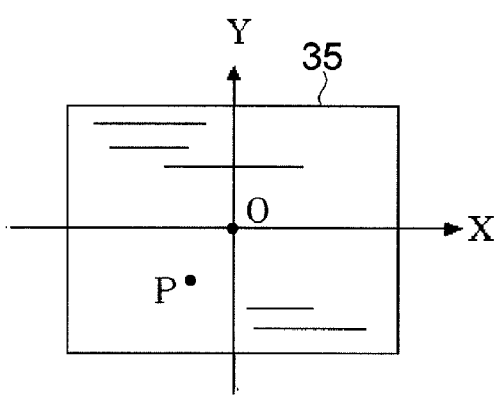

When the coordinates (correction coordinates) of the point Q are calculated as described above, the coordinates of the point Q shown in FIG. 7 is brought into correspondence with the point P (u, v, w) shown in FIG. 7D. Namely, when the coordinates of the point Q are calculated, pixel data on a memory address corresponding to this point Q (pixel data of the coordinates corresponding to the point Q out of pixel data stored in the above step 503) is read from the memory 6. By performing this coordinate calculation of the point Q on all points on the display plane 32, the distortion-corrected image 35 of the selected area corresponding to the display plane 32 (see FIG. 7D) is generated.

Figure 9:
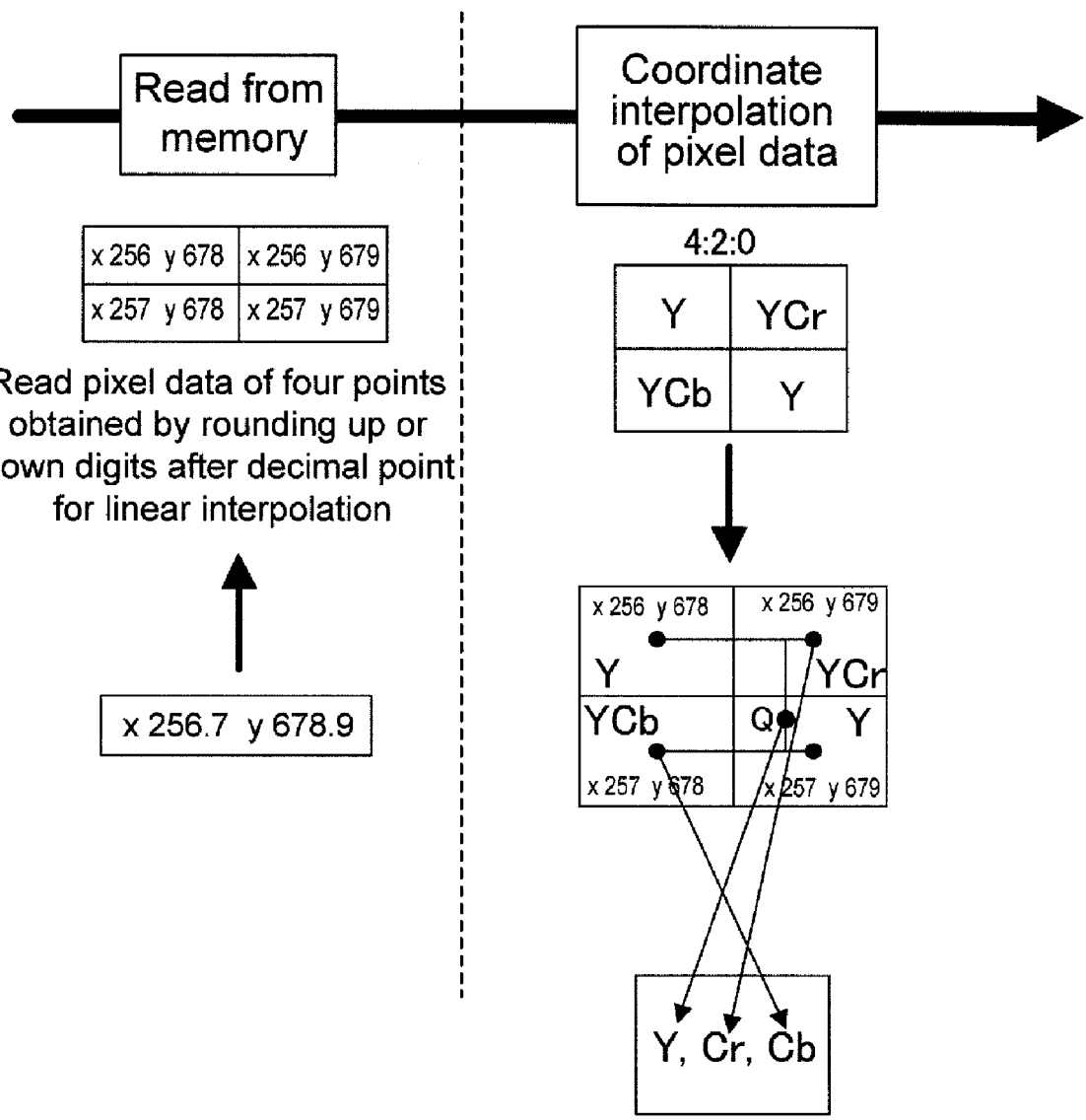
FIG. 9 is a diagram to explain the example of the principle of the coordinate conversion.

Here, as described above, the coordinates of the point Q found by the operation (memory address found by the operation) for the distortion correction are not in a one-to-one correspondence with each pixel constituting the distortion-corrected image 35 of the display plane 32 in many cases. Accordingly, the distortion correction processing circuit 4 performs interpolation using the coordinates found by the operation. As shown in FIG. 9, for example, the coordinates (x, y) of the point Q are each assumed to be a real number containing a decimal point (256.7, 678.9). Surrounding four pixel data containing this point Q are read from the memory 6. Namely, pixel data of four pixels obtained by rounding up or down digits after the decimal point are read. Coordinates of these four pixels are as follows.

upper left (256, 678)
upper right (256, 679)
lower left (257, 678)
lower right (257, 679)

Then, by performing the above coordinate interpolation processing on the point Q based on the pixel data on these four points (luminance data (Y data) and color difference data (CrCb data) on the respective four points), pixel data after the coordinate conversion of the point Q is acquired. There are various methods for the interpolation processing. For example, there are methods of calculating a mean value and calculating a median value from the pixel data of the four points. When the pixel data of the four points are YCrCb data and their format is 4:2:0, regarding the point Q, it is only necessary to linearly interpolate the luminance data (Y) and use color difference data of these four points themselves as the color difference data (Cr, Cb).

Figure 10:
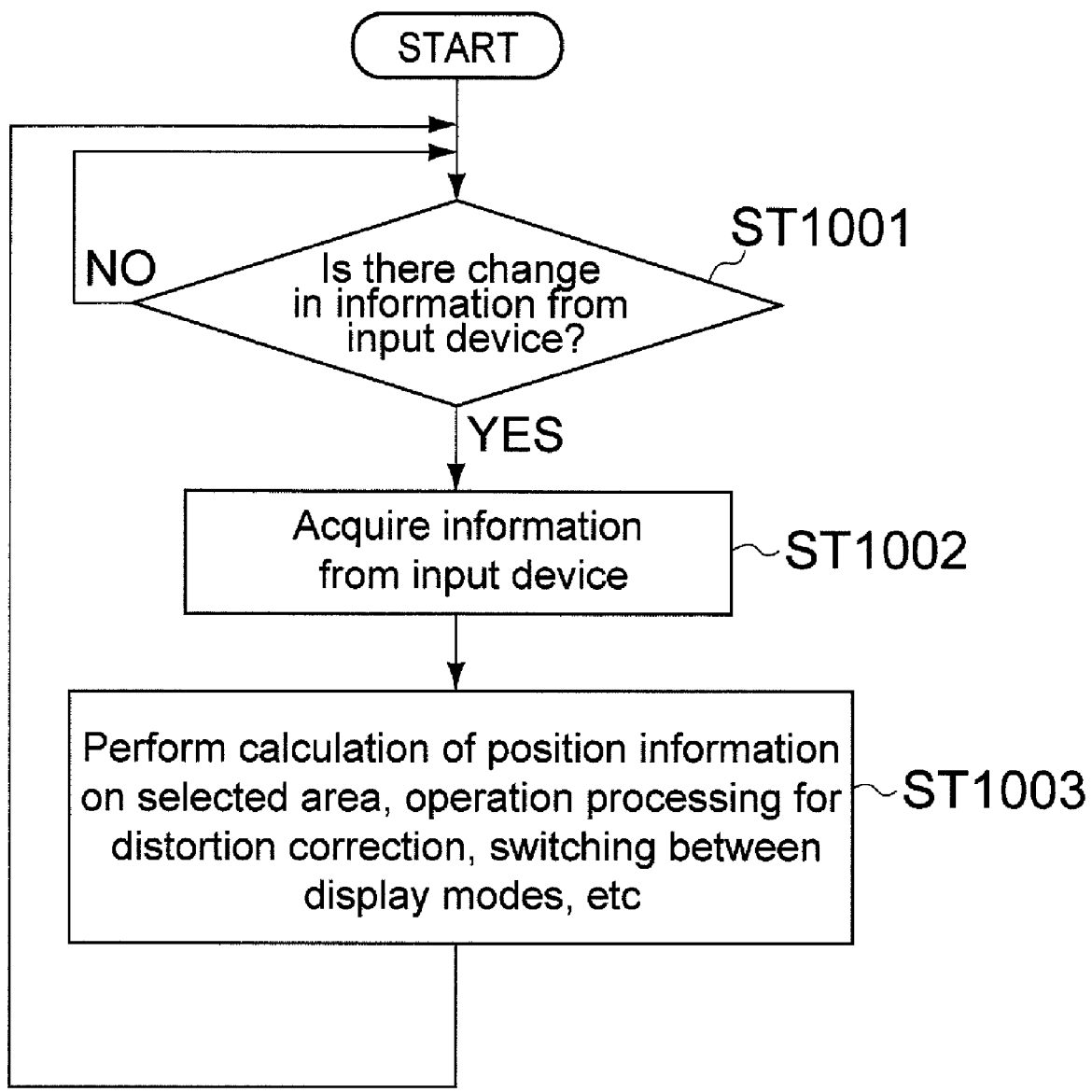
FIG. 10 is a flowchart showing an operation of updating a selected area image in response to an input signal from an input device.

FIG. 10 is a flowchart showing an operation of updating the selected area image, for example, in response to the input signal from the input device 14. When there is a change in the information from the input device 14 from a standby state of the image processing apparatus 10 (YES in step 1001), the controller 5 acquires this input information via the input device interface 11 (step 1002). The controller 5 performs calculation of position information on the highlighted area 16 in the entire image 25, operation processing for the distortion correction processing, operation processing for switching between the above display modes, and so on (step 1003).

Figure 11:
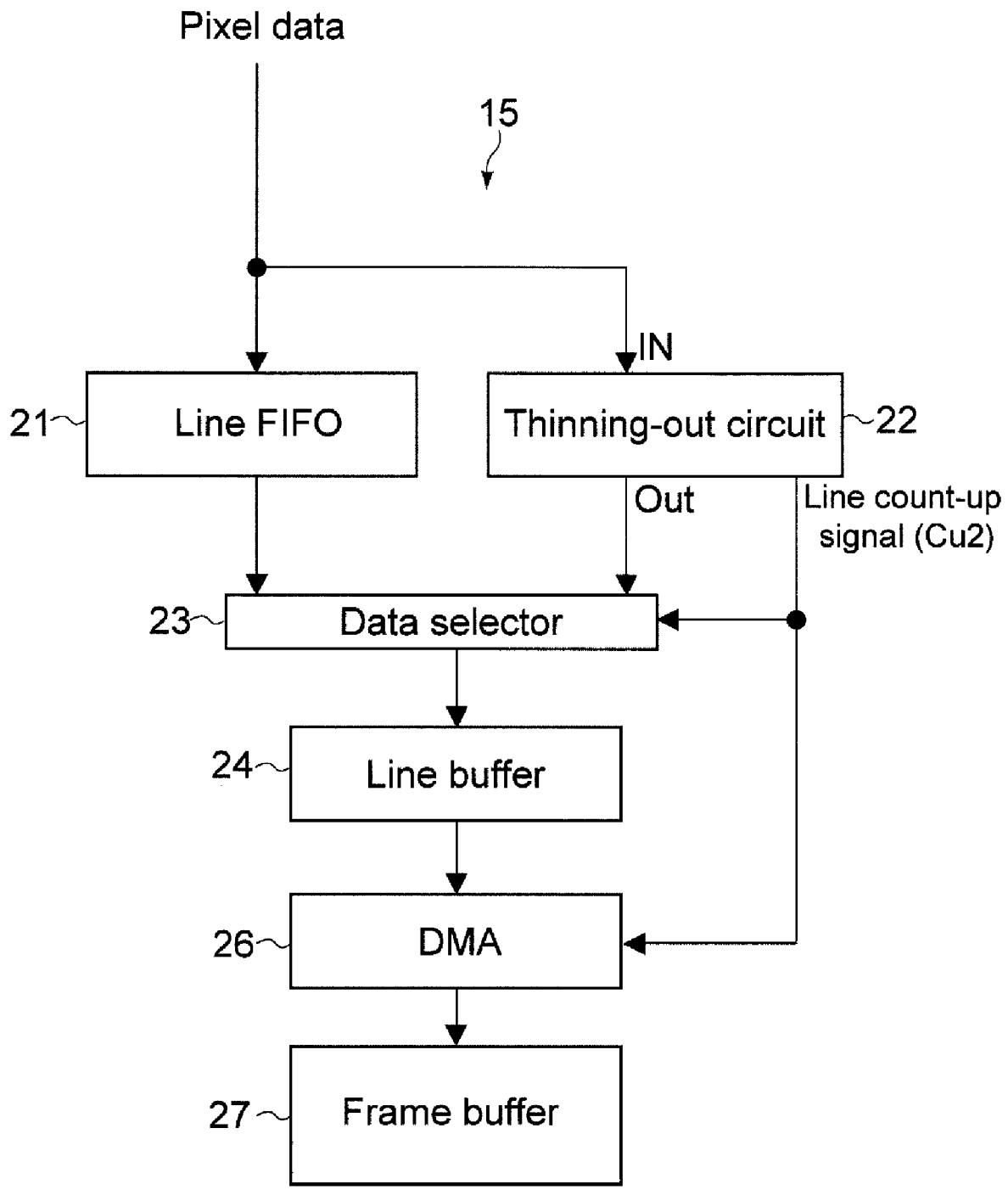
FIG. 11 is a block diagram showing a hardware configuration of a thinning-out processing circuit.

FIG. 11 is a block diagram showing a hardware configuration of the above thinning-out processing circuit 15.

The thinning-out processing circuit 15 includes a line FIFO (First In First Out) 21, a thinning-out circuit 22, a data selector 23, a line buffer 24, a DMA circuit 26, and a frame buffer 27.

The line FIFO 21 sequentially inputs pixel data of the wide-field image 25 as an actual image (hereinafter referred to as wide-field image data) line by line. The line means each line in the lateral direction of the image, and line data means data of each line constituting the image data.

The data selector 23 performs switching from an output of the wide-field image data to an output of thinned-out line data generated by the thinning-out circuit 22 in response to a predetermined timing. The data selector 23 performs switching from the wide-field image data to the thinned-out line data generated by the thinning circuit 22 and outputs this thinned-out line data to the buffer. Thus, the thinned-out data corresponding to the wide-field image data is efficiently generated.

The line buffer 24 inputs the wide-field image data and the thinned-out line data selected and outputted by the data selector 23 and sequentially outputs them line by line to the DMA circuit 26. The line buffer 24 is, for example, a buffer having a FIFO function.

The DMA circuit 26 transfers the wide-field image data and the thinned-out line data to the frame buffer 27 according to address control by the timing of a line count-up signal $Cu_2$ outputted from the thinning-out circuit 22. Consequently, the wide-field image data and data of the thinned-out image 45 (hereinafter referred to as thinned-out data) for display are temporarily stored in the frame buffer 27. For example, a DRAM is used as the frame buffer 27 or like, but the frame buffer 27 or the like is not limited to this.

Figure 12:
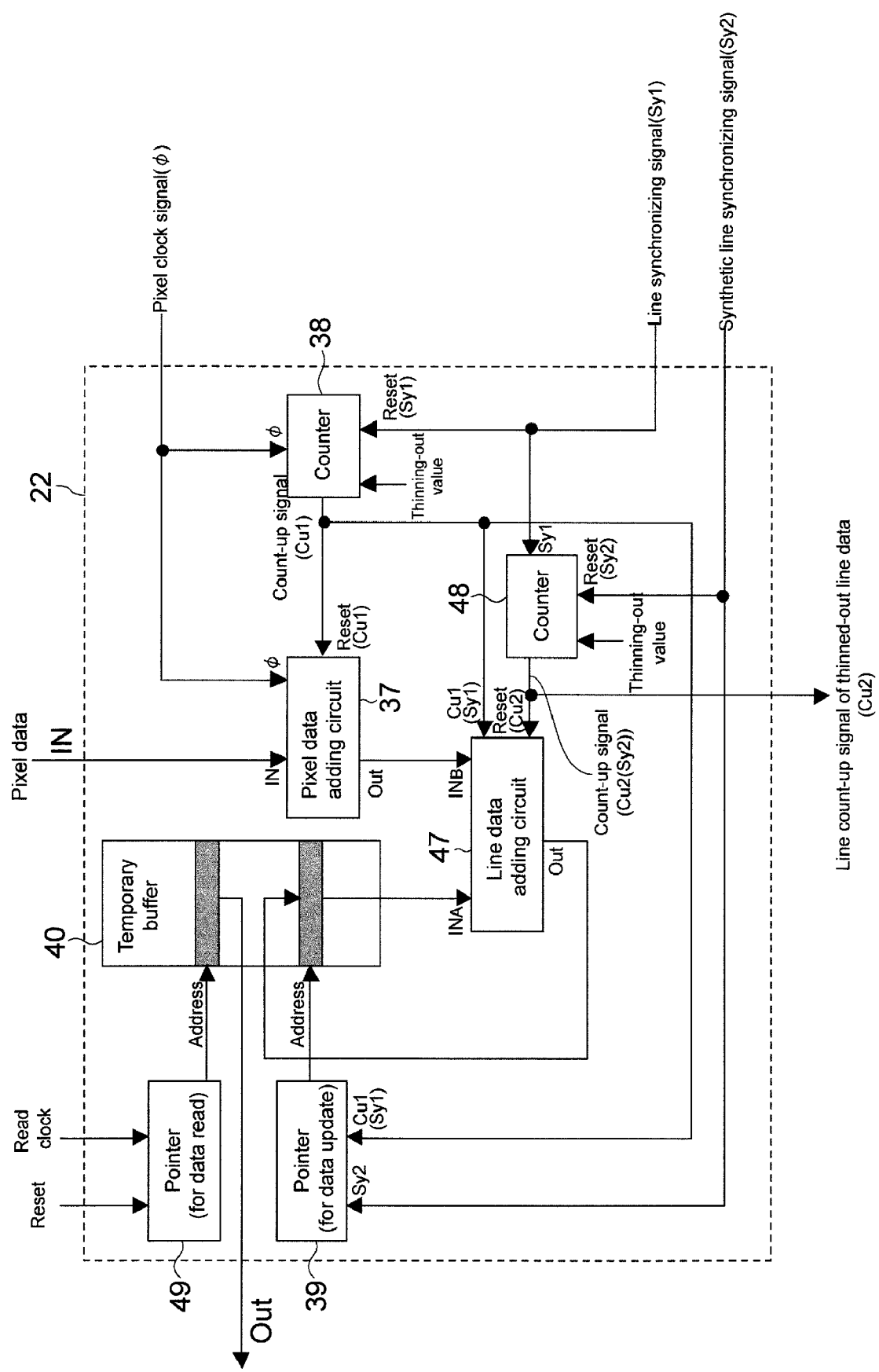
FIG. 12 is a block diagram showing a hardware configuration of a thinning-out circuit.

FIG. 12 is a block diagram showing a hardware configuration of the thinning-out circuit 22. The thinning-out circuit 22 includes a pixel data adding circuit (first addition section) 37, a line data adding circuit (second addition section) 47, a counter for pixel data (first counter) 38, a counter for line data (second counter) 48, a temporary buffer 40, a pointer for data update (first pointer) 39, and a pointer for data read (second pointer) 49.

Figure 13A:
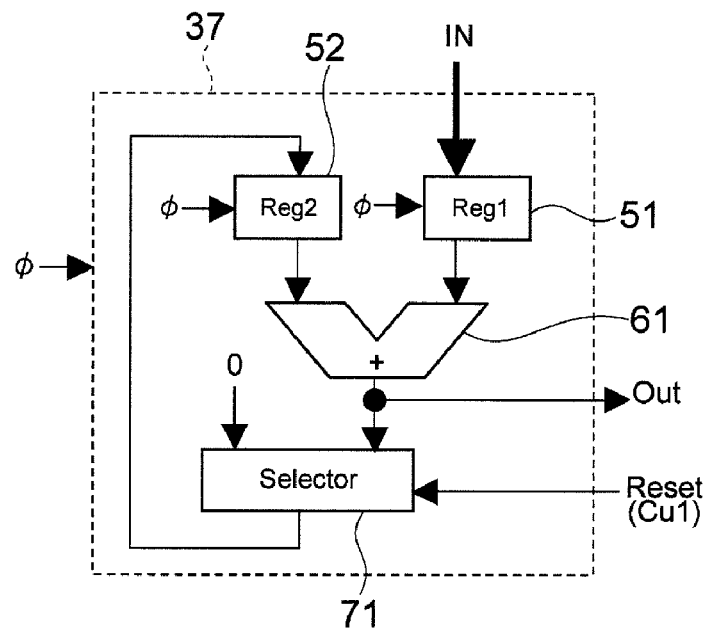
FIG. 13A is a diagram showing the configuration of a pixel data adding circuit.

FIG. 13A is a diagram showing the configuration of the pixel data adding circuit 37. The pixel data adding circuit 37 sequentially takes in pixel data, adds them in units of a predetermined number of pixels in a line direction, and outputs added pixel data obtained by the addition. Typically, the pixel data adding circuit 37 includes a first register 51 storing the inputted pixel data, a second register 52 storing the pixel data outputted by a selector 71, an adder 61 adding the pixel data outputted from both the registers 51 and 52, and the selector 71 selecting either of the pixel data added by the adder 61 or "0" under a predetermined condition.

Figure 13B:
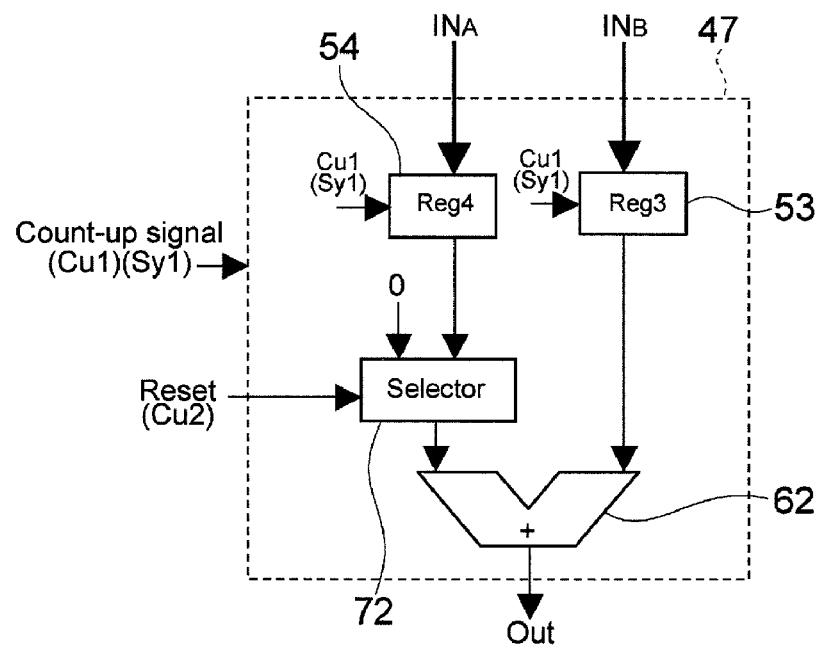
FIG. 13B is a diagram showing the configuration of a line data adding circuit.

FIG. 13B is a diagram showing the configuration of the line data adding circuit 47. The line data adding circuit 47 adds line data constituted by the added pixel data outputted from the pixel data adding circuit 37 in units of a predetermined number of lines in a column direction and outputs the thinned-out line data obtained by the addition. Typically, the line data adding circuit 47 includes a third register 53 storing the above inputted line data, a fourth register 54 storing added line data constituted by the added plural line data outputted from the temporary buffer 40, a selector 72 selecting either of the line data outputted from the fourth register 54 or "0" under a predetermined condition, and an adder 62 adding the line data from the third register 53 and the line data from the selector 72.

Figure 14:
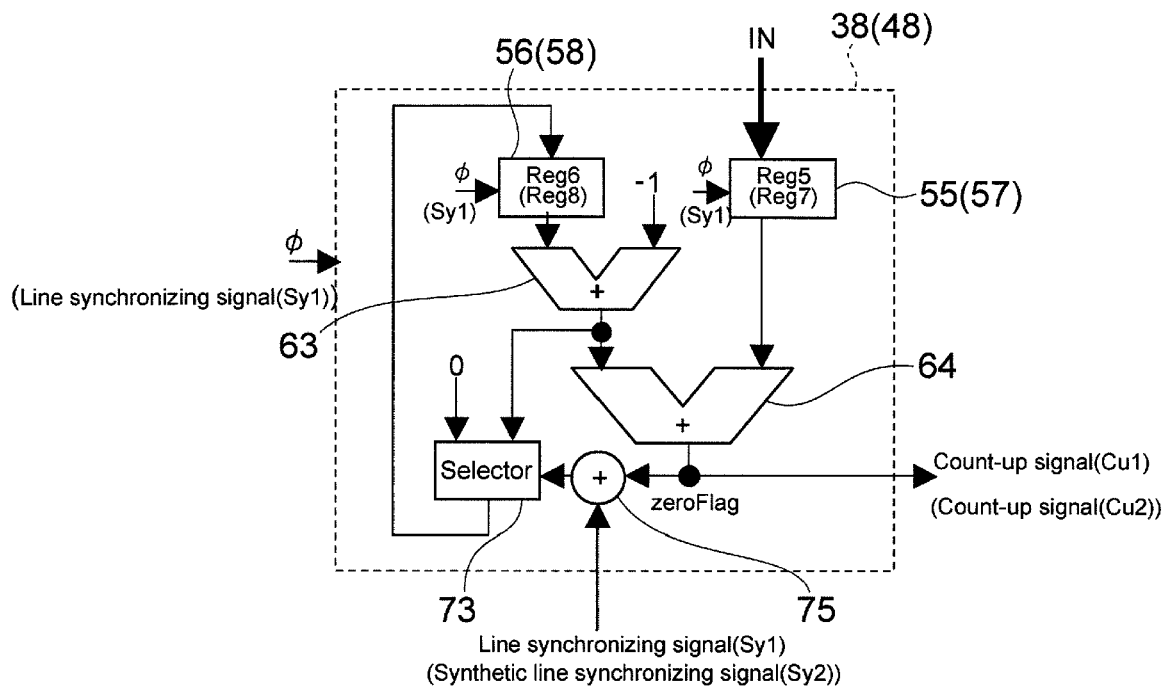
FIG. 14 is a diagram showing the configuration of a first counter (second counter)

FIG. 14 is a diagram showing the configuration of the first counter 38 and the second counter 48. The first counter 38 and the second counter 48 have the same configuration. The first counter 38 (second counter 48) outputs a sequential count-up signal $Cu_1$ ($Cu_2$) to the pixel data adding circuit 37 (line data adding circuit 47). This count-up signal $Cu_1$ ($Cu_2$) is inputted to a selector 73. Typically, the first counter 38 (second counter 48) includes a fifth register 55 (seventh register 57) storing a predetermined target value (thinning-out value) (natural number), a sixth register 56 (eighth register 58) storing a count value outputted from the selector 73, a first adder 63 adding the count value from the sixth register 56 (eighth register 58) and a "−1" value, a second adder 64 adding the thinning-out value from the fifth register 55 (seventh register 57) and the value obtained by the addition from the first adder 63, the selector 73 selecting either of the count value from the first adder 63 or a "0" value, and a reset signal receiving unit 75 receiving a line synchronizing signal $Sy_1$ (synthetic line synchronizing signal $Sy_2$) described later as a reset signal.

Figure 15:
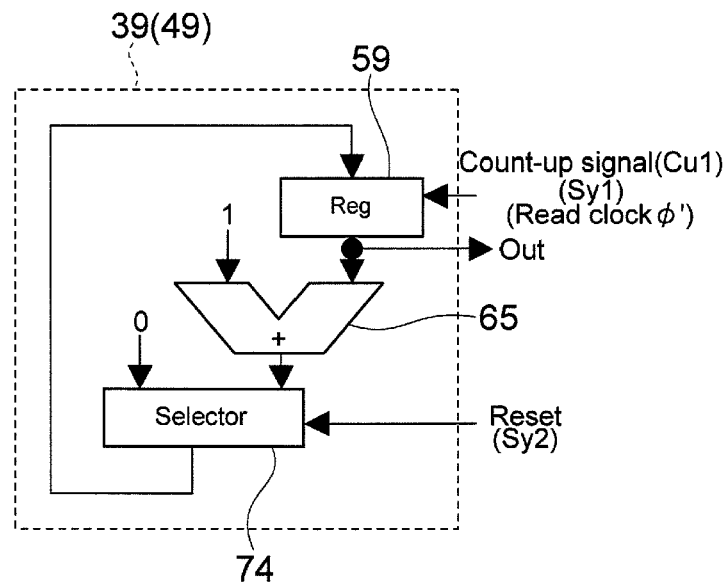
FIG. 15 is a diagram showing the configuration of a first pointer (second pointer)

FIG. 15 is a diagram showing the configuration of the first pointer 39 and the second pointer 49. The first pointer 39 and the second pointer 49 have the same configuration. The first pointer 39 (second pointer 49) points to an address in the temporary buffer 40. Typically, the first pointer 39 (second pointer 49) includes a register 59 storing the value of the count-up signal $Cu_1$ (read clock φ'), an adder 65 adding an output value from the register 59 and a "1" value, and a selector 74 selecting either of the value obtained by the addition from the adder 65 or the "0" value under a predetermined condition.

Next, the operation of the thinning-out processing circuit 15 in step 505 will be described.

With reference to FIG. 11, the wide-field image data stored in the memory 6 is sequentially inputted to the line FIFO 21 and the thinning-out circuit 22. The line FIFO 21 sequentially outputs the wide-field image data to the line buffer 24 upon request of the data selector 23. The wide-field image data is stored in the frame buffer 27 via the line buffer 24 and the DMA circuit 26. Incidentally, the wide-field image data may be directly inputted, not via the line buffer 24, to the DMA circuit 26.

The data selector 23 performs switching from the output of the wide-field image data from the line FIFO 21 to the output of the thinned-out line data generated by the thinning-out circuit 22 at a timing when the count value of the line count-up signal $Cu_2$ (line count-up signal for thinned-out line data described later) outputted from the thinning-out circuit 22 becomes a predetermined count value.

Figure 16:
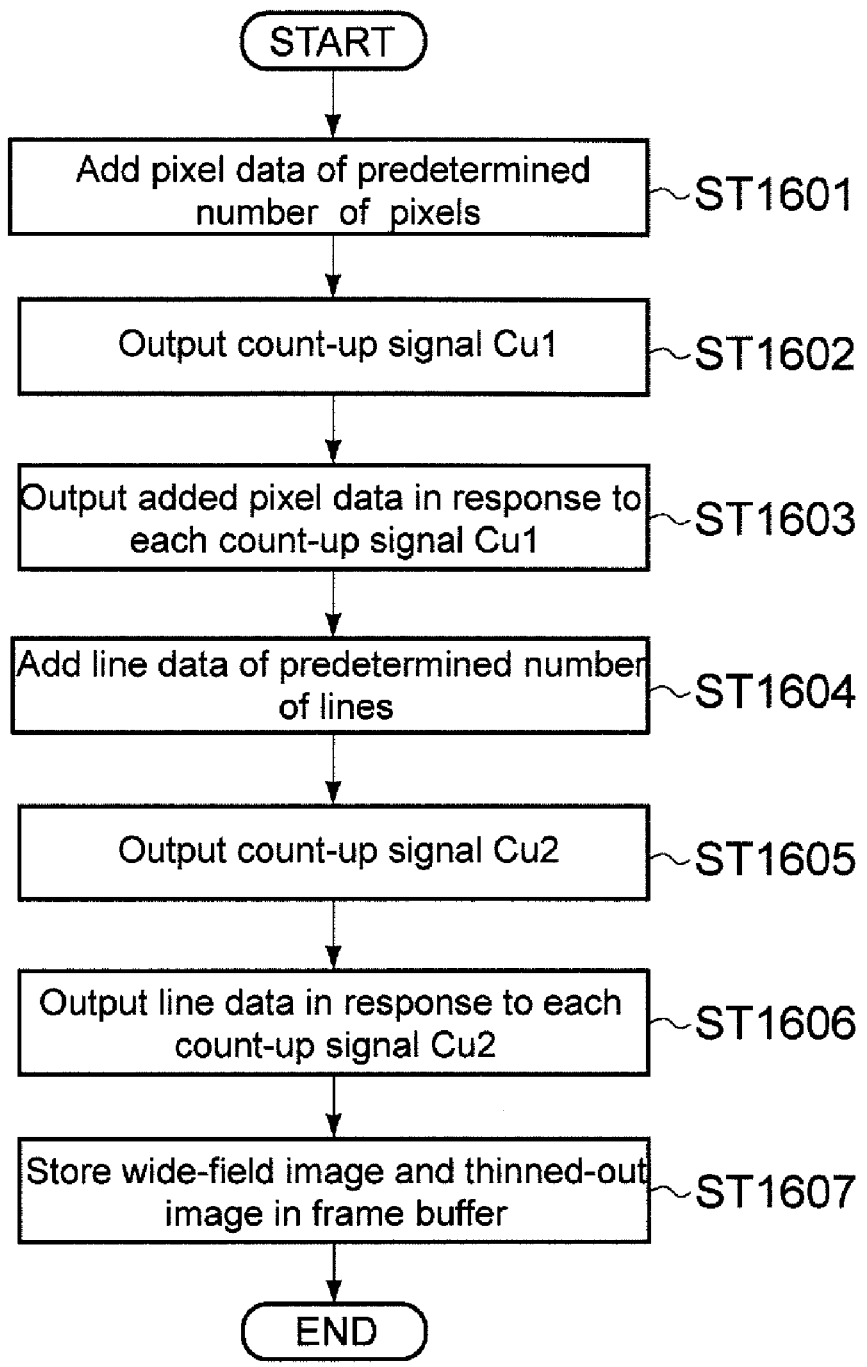
FIG. 16 is a flowchart showing an operation when the thinning-out circuit generates thinned-out line data.

Here, the operation of generating the thinned-out line data by the thinning-out circuit 22 will be described with reference to FIG. 12 to FIG. 15. FIG. 16 is a flowchart showing this operation. In FIGS. 13A and 13B, φ is a pixel-by-pixel processing clock and hereinafter called a pixel clock. Further, $Sy_1$ is a line-by-line synchronizing signal and hereinafter called the line synchronizing signal. Furthermore, $Sy_2$ is a synchronizing signal with respect to each thinned-out line data generated by adding line data of a predetermined number of lines and hereinafter called the synthetic line synchronizing signal.

In the first counter 38, the predetermined target value is set in the fifth register 55. This target value is the thinning-out value, that is, a value representing a thinning-out ratio. The target value is a thinning-out value indicating a thinning-out ratio in the line direction in the pixel data adding circuit 37, and, for example, in the case of thinning-out to ⅛ in the line direction, the target value is set to "8". In response to the line synchronizing signal $Sy_1$ sent from the controller 5 or the like, the reset signal receiving unit 75 receives it as the reset signal. When the reset signal is received, the selector 73 selects "0", and "0" is set in the sixth register 56. The first adder 63 adds "0" and "−1", and outputs "−1" to the selector 73 and the second adder 64. The selector 73 sets this "−1" in the sixth register 56. The second adder 64 outputs "7" by adding the target value "8" and "−1". Such an operation is repeated (step 1601), and a countdown from "8" to "0" is performed by the second adder 64. The count-up signal $Cu_1$ is outputted at a timing when the second adder 64 outputs "0". Thus, when the target value is "8", the first counter 38 outputs one count-up signal $Cu_1$ with respect to eight pixel clocks (step 1602). This count-up signal $Cu_1$ is inputted to the pixel data adding circuit 37.

Figure 17:
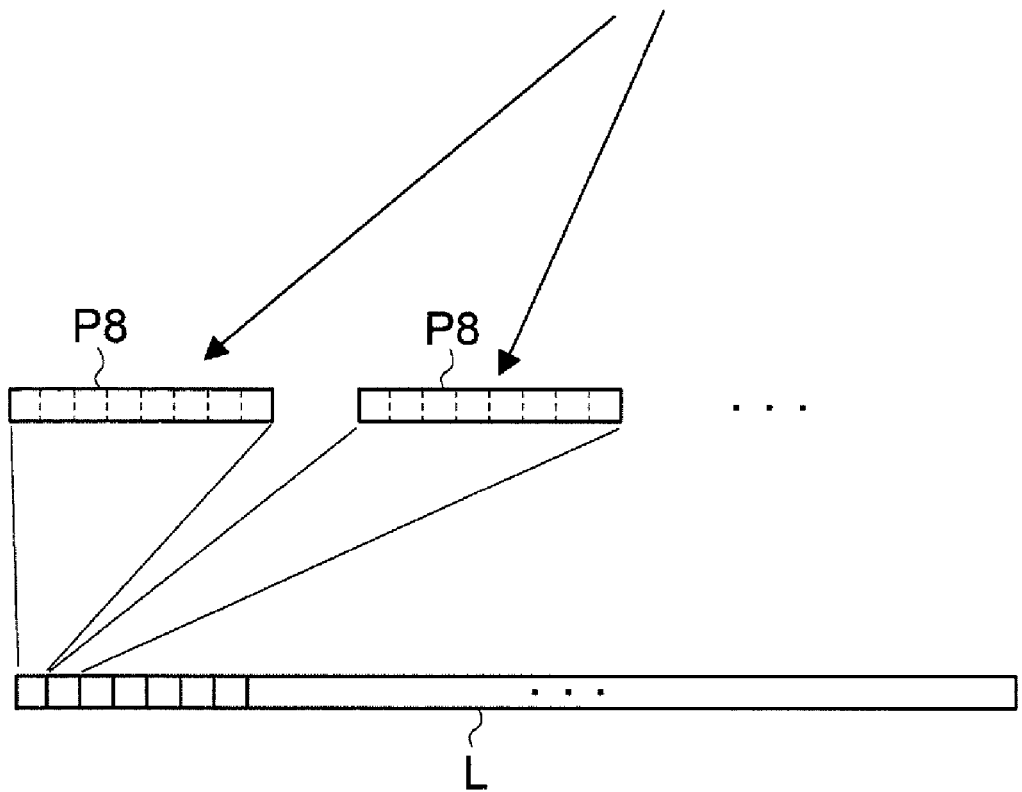
FIG. 17 is a diagram showing a manner in which pixel data are added.

In the pixel data adding circuit 37, the count-up signal $Cu_1$ from the first counter 38 is inputted as the reset signal to the selector 71. The selector 71 selects "0" in response to the reset signal, and "0" is set in the second register 52. Out of pixel data constituting the wide-field data stored in the memory 6, first, for example, the first pixel data of the uppermost line is stored in the first register 51. The adder 61 adds "0" and this first pixel data, and this first pixel data is selected by the selector 71 and stored in the second register 52. Then, the second pixel data is stored in the first register 51. The adder 61 adds the first pixel data stored in the second register 52 and the second pixel data stored in the first register 51. Such an operation is repeated, and pixel data are added in units of a predetermined number of pixels by the adder 61. Typically as shown in FIG. 17 and FIG. 20, eight pixel data p are added to generate added pixel data P8. In other words, reset is performed every time eight pixel data p are added by the above count-up signal $Cu_1$, the selector 71 selects "0", and consequently the pixel data adding circuit 37 outputs the added pixel data P8 corresponding to eight pixel data (step 1603). FIG. 20 is a conceptual diagram showing data when the data of the wide-field image 25 and the thinned-out data 45 are added and stored in the frame buffer 27 (the above step 505) (see FIG. 19).

Incidentally, typically the pixel data stored in the memory 6 are burst read every eight lines. Consequently, the number of accesses to the memory 6 is reduced. one pixel data is, for example, eight to ten bits, and the addition of eight pixel data leads to an increase of only three bits.

The pixel data adding circuit 37 repeats the above operation, and as shown in FIG. 17, a plurality of added pixel data P8 corresponding to one line L are generated. The added pixel data corresponding to one line (line data L) has only to be stored in a buffer memory not shown.

Alternatively, it is also suitable to provide a plurality (one-eighth the number of pixels corresponding to one line) of such pixel data adding circuits 37 and perform parallel processing. The numbers of line data adding circuits 47, counters 38, and so on provided in this case have only to correspond to the number of pixel data adding circuits 37.

The line data adding circuit 47 operates in the same manner as the pixel data adding circuit 37. The line data adding circuit 47 takes in the above line data L and adds the line data L in the column direction in response to each line synchronizing signal $Sy_1$ using the temporary buffer 40 (step 1604).

The second counter 48 operates in the same manner as the first counter 38. In the second counter 48, a predetermined thinning-out value (for example, "8") is set in the seventh register 57. The second counter 48 outputs one count-up signal $Cu_2$ for every eight line synchronizing signals $Sy_1$ with the synthetic line synchronizing signal $Sy_2$ as the reset signal (step 1605). As shown in FIG. 11, the synthetic line synchronizing signal $Sy_2$ is outputted as the line count-up signal to the data selector and outputted as a timing signal of address control of the DMA circuit 26.

Figure 18:
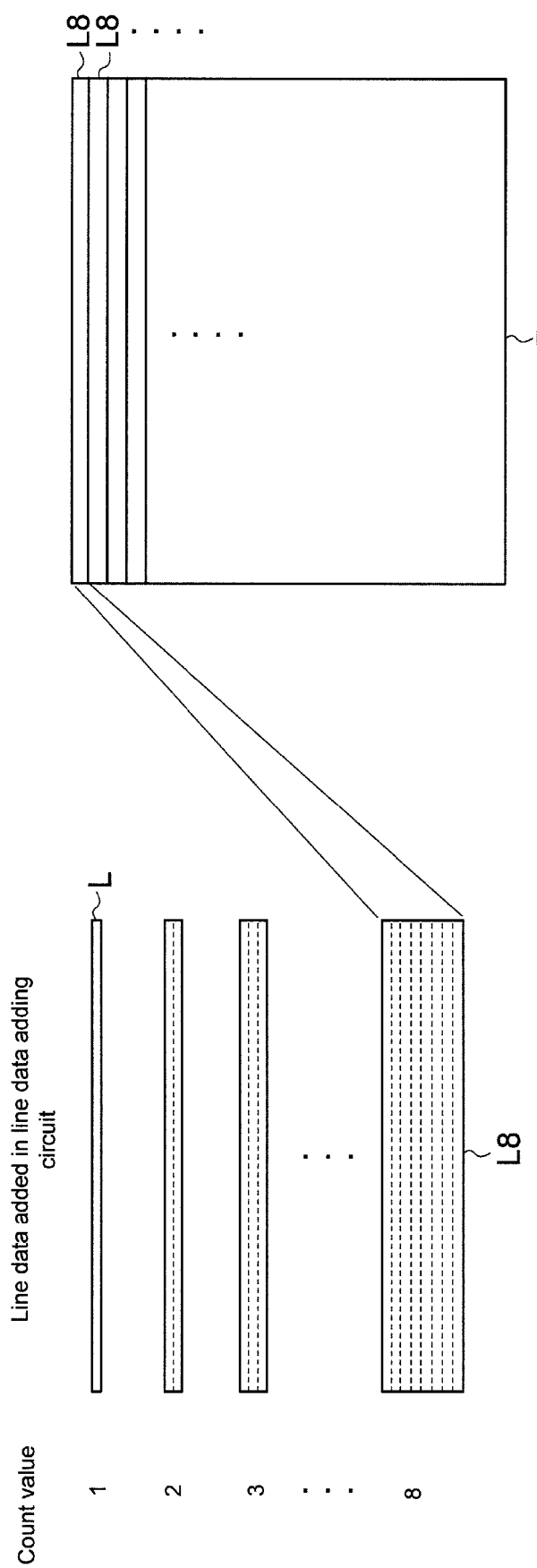
FIG. 18 is a diagram showing a manner in which line data are added.

In the line data adding circuit 47, the selector 72 selects 0 every time the synthetic line synchronizing signal $Sy_2$ is inputted. Meanwhile, the first pointer 39 increments the point value by "1" in response to each line synchronizing signal $Sy_1$. In response to each synthetic line synchronizing signal $Sy_2$, the selector 72 selects 0 and outputs a point value "8" to the temporary buffer 40 to update the address. Thus, as shown in FIG. 18, the line data adding circuit 47 generates eight added line data (thinned-out line data L8) in response to each synthetic line synchronizing signal $Sy_2$ (step 1606), stores it in the temporary buffer 40, and updates it. One-frame thinned-out image F (thinned-out data) is generated by collecting the thinned-out line data L8 of a predetermined number of lines. This thinned-out image F becomes the above thinned-out image 45 (see FIG. 2C).

The second pointer 49 takes in the predetermined read clock φ', and at this timing, reads the thinned-out line data L8 of one line from the temporary buffer 40. Then, the thinning-out circuit 22 outputs the read thinned-out line data L8 to the line buffer 24 in response to the line count-up signal (at a timing of the synthetic line synchronizing signal $Sy_2$).

When the thinned-out line data L8 of one line from the line buffer 24 is outputted, the data selector 23 performs the switching to the output of the wide-field image data from the line FIFO 21 as described above, and outputs this wide-field image data to the frame buffer 27 via the line buffer 24 and the DMA circuit 26.

Here, the relationship among the rates of the pixel clock φ, a read clock of the frame buffer 27, and a clock of the line buffer 24 is as follows.

"pixel clock φ<<read clock of frame buffer 27<<clock of line buffer 24"

Figure 19:
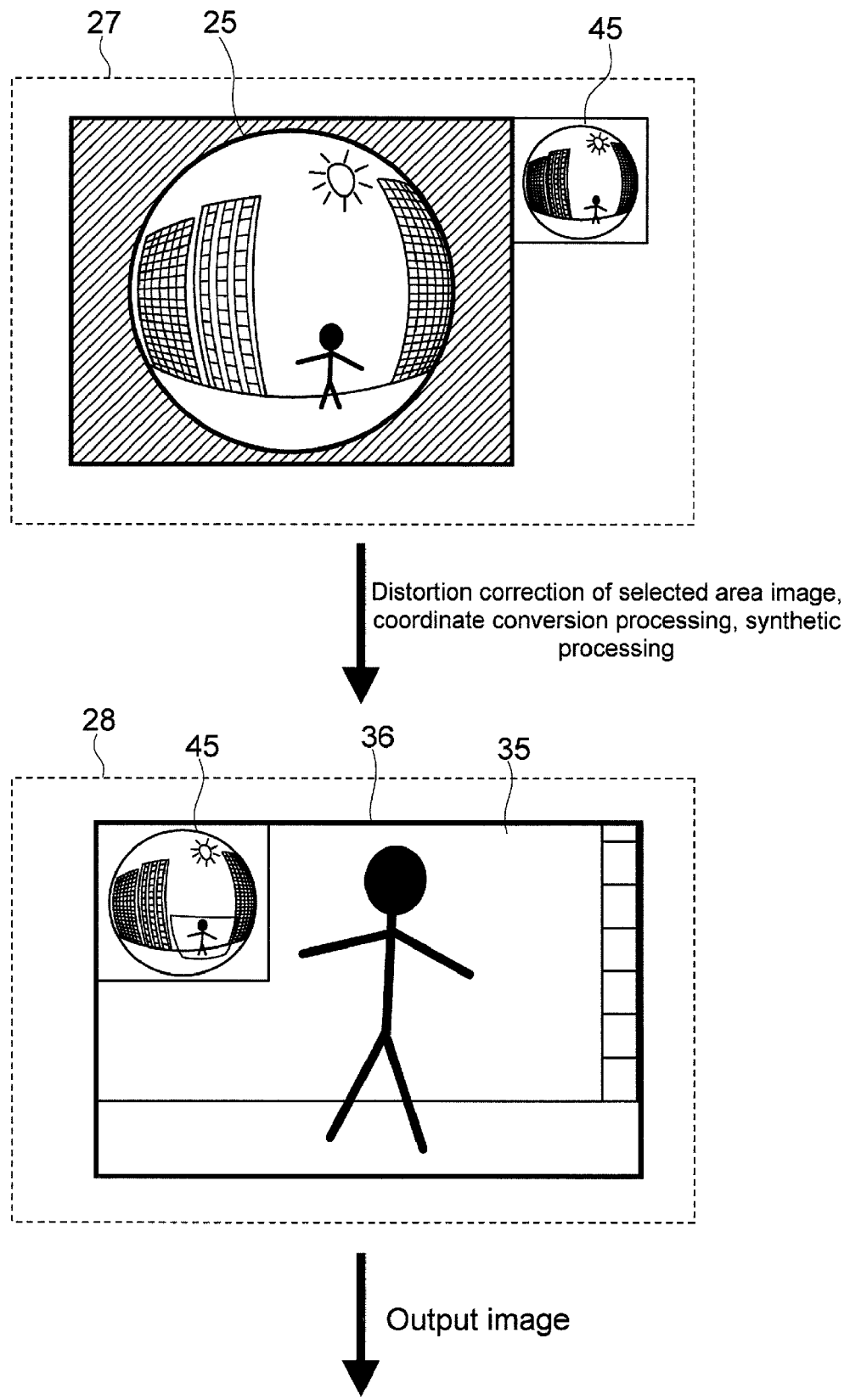
FIG. 19 is a diagram showing images stored in a frame buffer and a frame memory.

In other words, the line buffer 24 is almost always in an empty state. Hence, as shown in FIG. 19, in the frame buffer 27, the wide-field image 25 and the thinned-out image 45 are stored (step 1607). As described above, the synthetic image 36 is stored in a frame memory for output 28 by the distortion correction, coordinate conversion processing, and synthetic processing of data of the specified address in the frame buffer 27, that is, the selected area image (in the case of the mode shown in FIG. 2C, for example, out of those shown in FIG. 2A to FIG. 2C). One and the same memory may be used as the frame buffer 27 and the frame memory for output 28.

Incidentally, typically the wide-field image data and the thinned-out data stored in the frame buffer 27 are stored as synchronized data. This is because line-by-line synchronization is possible due to the above difference among the respective clocks. However, it is also no problem to make the rates of the wide-field image data and the thinned-out data different.

As described above, the thinning-out circuit 22 according to this embodiment generates the thinned-out line data separately in the line direction and the column direction by the pixel data adding circuit 37 and the line data adding circuit 47, which enables efficient thinning-out processing.

Figure 21:
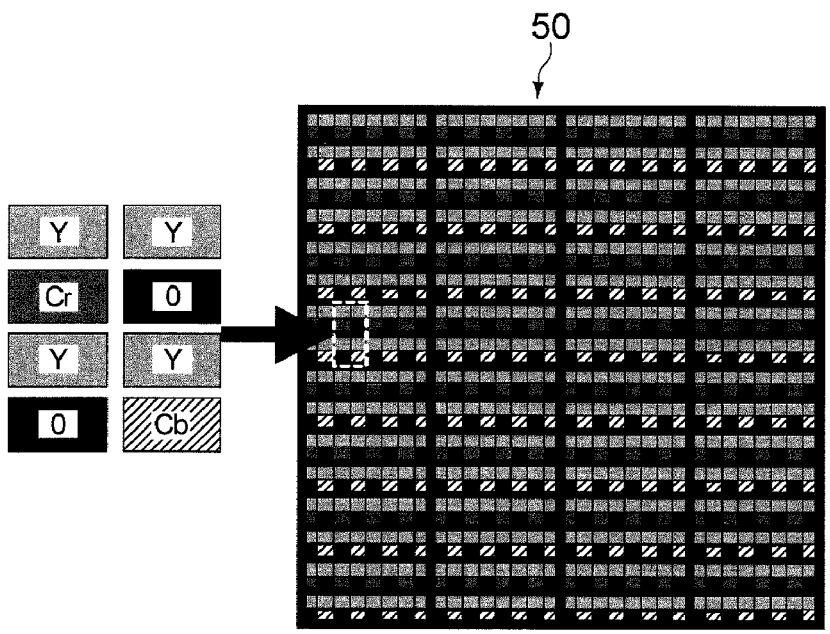
FIG. 21 is a diagram showing pixel data of 4:2:0 YCrCb.

Further, in this embodiment, after the conversion into the YCrCb data having a smaller data amount than the RGB data, the thinned-out data is generated. This makes it possible to reduce the calculation amount and realize efficient processing. FIG. 21 is a conceptual diagram of pixel data to explain this. For example, when in the color processing circuit 3, a conversion from the RGB data into the 4:1:1 YCrCb data and then 4:2:0 processing are performed, image data 50 such as shown in FIG. 21 is sent to the thinning-out processing circuit 15. In other words, in 2×2=4 pixels, each of the four pixels contains one Y data (luminance data), and one data common to the eight pixels is used as color difference data of Cr data (Cb data).

Figure 22:
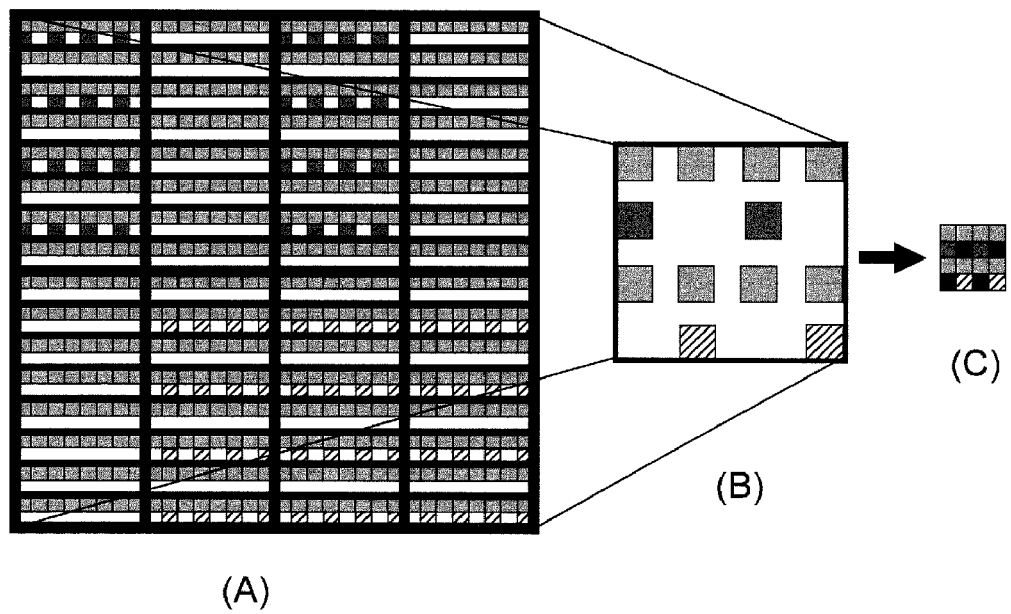
FIGS. 22A to 22C are diagrams showing a manner in which thinned-out data is generated while the format of the pixel data in FIG. 21 is maintained.

In this case, in the thinning-out circuit 22, as shown in FIGS. 22A and 22B, addition processing of pixel data and addition processing of line data are performed such that the same 4:2:0 format as that of the sent image data 50 can be obtained. Consequently, the YCrCb data subjected to the thinning-out processing can be faithfully reproduced in the thinned-out line data L. FIGS. 22A and 22B show the processing of thinning-out to 1/8 in the line direction and the column direction. FIG. 22C shows pixel data of a finally displayed thinned-out image. As just described, the processing is performed by the thinning-out circuit 22 after the YCrCb conversion and the 4:2:0 processing, and hence it is only necessary to make a calculation regarding pixels shown in FIG. 22A. Its calculation amount becomes about (9/8)/3=3/8 with respect to RGB. This is because if the calculation amount of Y is 1, RGB is 3, and Cr and Cb are 1/8. 9 is assumed from 3×3 which is the case of three each of RGB data.

Embodiments according to the present invention are not limited to the embodiment described above, and other various embodiments can be conceived.

For example, in the above embodiment, the RBG data is converted into the YCrCb data, and the thinned-out data is generated regarding the pixel data after the conversion. However, the thinned-out data may be generated regarding RGB pixel data.

In the above embodiment, the thinning-out ratio is set to 1/8, but this setting can be appropriately changed. Note, however, that a power of two facilitates control.

What is claimed is:

1. An image processing apparatus, comprising:
   a conversion section that converts first image data in a first format into second image data in a second different format, the first and second image data associated with a wide-field image having distortion due to being captured using a wide-angle lens;
   a thinning-out section that generates thinned-out line data from the second image data and sequentially outputs the thinned-out line data at every predetermined timing, a plurality of the thinned-out line data constituting thinned-out data corresponding to a thinned-out wide-field image;
   a switching section that performs switching from an output of the second image data to an output of the thinned-out line data in response to a predetermined signal;
   a correction section that performs distortion correction on a selected area of the wide-field image to generate a distortion-corrected image; and
   a synthesis section that synthesizes the thinned-out wide-field image and the distortion-corrected image to generate a synthesized image for display on a display unit.

2. The image processing apparatus as set forth in claim 1, wherein the thinning-out section includes:
   a first addition section that (i) adds together, in a line direction, pixel data of respective pixels constituting the second image data in units of a predetermined number of pixels and (ii) outputs added pixel data obtained by the addition; and
   a second addition section that (i) adds together, in a column direction, line data constituted by a predetermined number of the added pixel data sequentially outputted in units of a predetermined number of lines and (ii) outputs the thinned-out line data obtained by the addition.

3. The image processing apparatus as set forth in claim 1, wherein the first image data comprises RGB data of the wide-field image and the second image data comprises luminance and color difference data of the wide-field image.

4. The image processing apparatus as set forth in claim 3, wherein the thinning-out section generates the thinned-out line data in the same format as that of the luminance and color difference data generated by the conversion section.

5. The image processing apparatus as set forth in claim 1, wherein the synthesized image further includes a highlighted area in the thinned-out wide-field image, the highlighted area highlighting a portion of the thinned-out wide-field image corresponding to the selected area of the wide-field image.

6. An image processing method, comprising:
   converting first image data in a first format into second image data in a second different format, the first image data and the second image data associated with a wide-field image having distortion due to being captured using a wide-angle lens;
   generating thinned-out line data by thinning out the second image data;
   sequentially outputting the thinned-out line data at every predetermined timing, a plurality of the thinned-out line data constituting thinned-out data corresponding to a thinned-out wide-field image;
   switching from an output of the second image data to an output of the thinned-out line data in response to a predetermined signal;
   performing distortion correction on a selected area of the wide-field image to generate a distortion-corrected image; and
   synthesizing the thinned-out wide-field image and the distortion-corrected image to generate a synthesized image for display on a display unit.

* * * * *